July 22, 1969  J. E. BARKER  3,457,035
METHOD FOR PRODUCING CUPROUS OXIDE
Filed Dec. 7, 1966  2 Sheets-Sheet 2
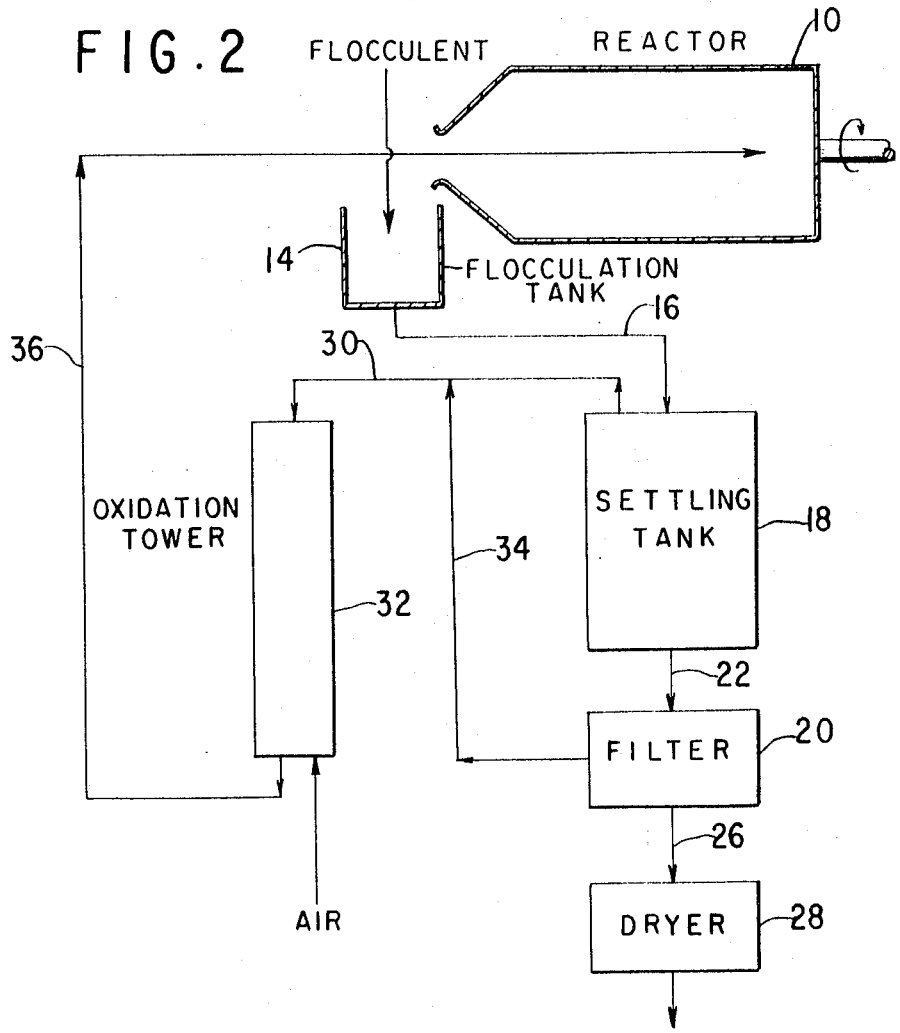
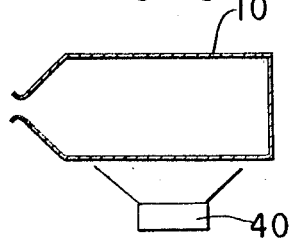
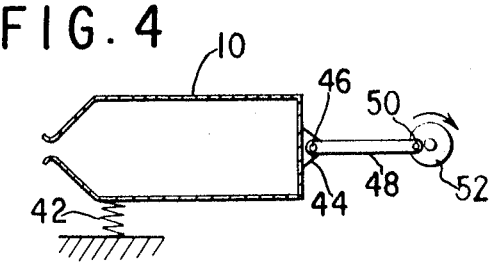
INVENTOR
JAMES E. BARKER
ATTORNEY

United States Patent Office 3,457,035
Patented July 22, 1969

3,457,035
METHOD FOR PRODUCING CUPROUS OXIDE
James E. Barker, East Point, Ga., assignor to Tennessee Corporation, New York, N.Y., a corporation of Delaware
Filed Dec. 7, 1966, Ser. No. 599,886
Int. Cl. C01g 3/02, 1/00
U.S. Cl. 23—147                                10 Claims

ABSTRACT OF THE DISCLOSURE

A process for producing cuprous oxide from metallic copper by leaching metallic copper shot or similar particles with cupric ammonium carbonate solution to form a cuprous ammonium carbonate solution and a coating of cuprous oxide on the surface of the metallic copper, and simultaneously subjecting the cuprous oxide coated copper to an attriting or rubbing action whereby cuprous oxide is continually formed and deposited in the solution. The solution containing the cuprous oxide as a slurry is treated with a flocculent and filtered to separate the cuprous oxide product. The solution of cuprous ammonium carbonate is then oxidized and recycled into the reactor.

BACKGROUND OF THE INVENTION

This invention relates to a process for the production of cuprous oxide from metallic copper by leaching the copper with an ammonium carbonate solution, and extracting the resultant cuprous oxide by attrition and filtration.

Cuprous oxide $Cu_2O$ is a dark red or carmine-red crystal or powder which is used in the production of copper salts, in ceramics, and for the development of porcelain red glaze and red glass. It is important in electroplating and in antifouling paints. It is also of value in agriculture as a seed treatment material to control seed-borne and soil-borne disease organisms, and although other compounds may be used, it is still the best fungicide for certain crop seed treatments, and has gained recent acceptance as a fungicide on citrus fruits.

The industrial manufacturere of copper oxides is usually based on furnace technology or electrolytic methods. Furnace technology is used for producing both cuprous and cupric oxides. One of the principal difficulties is to avoid obtaining mixtures of the two with one another or with metallic copper. When copper is subjected to an elevated temperature, cuprous oxide forms as a scale on its surface. Subsequent oxidation of the cuprous oxide results in the formation of the cupric compound. Subjecting the metal to an oxidizing furnace atmosphere at moderate temperatures for a prolonged time produces a product that is largely cupric oxide. In order to produce cuprous oxide, the material must be brought to a higher temperature, one at which the decomposition pressure of cupric oxide exceeds the partial pressure of oxygen in a normal atmosphere and the resulting material must then be brought to room temperature by rapid quenching or by being allowed to cool in an inert atmosphere in which recombination with oxygen cannot occur. The electrolytic methods for producing cuprous oxide utilize an alkaline solution of sodium chloride as electrolyte, with anodes of refined copper and cathodes of copper sheet. Cuprous oxides of a relatively uniform quality are formed at the anode.

Another method for obtaining cuprous oxide is based on the Calumet and Hecla's ammonium carbonate process for producing cupper oxides. It is an ore benefication process in which the ore containing metallic copper is leached with a cupric ammonium carbonate solution, thereby forming a cuprous ammonium carbonate solution, which in turn is heated, boiling off the ammonia and carbon dioxide and thereby precipitating a copper oxide. The mixture having cuprous and cupric oxides, ammonia and carbon dioxide are recovered and recycled. This method while economical requires heat to boil off the ammonia and carbon dioxide.

Attempts have been made at various times to produce a commercial grade of cuprous oxide by the distillation of solutions of copper ammonium carbonate that have been highly reduced to the cuprous state by reaction with metallic copper with limited success. U.S. Patent No. 2,474,533 issued on June 28, 1949, to L. C. Klein discloses a method for selective precipitation of cuprous oxide by using water-soluble organic acids to form a soluble cupric salt.

SUMMARY OF THE INVENTION

My invention concerns a method of obtaining and separating cuprous oxide out of a cuprous ammonium salt solution, without having to either use selective reactants and solvents, or excessive amounts of heat to boil off the ammonia and other gases, plus the additional advantage of not having to reconvert the ammonia and other gas to an ammonium salt solution.

It is therefore an object of my invention to provide a novel process for obtaining a substantially homogenous cuprous oxide product by leaching metallic copper with a cupric ammonium carbonate solution.

Another object of my invention is to provide a method for separating cuprous oxide suspension from a leaching solution of cupric ammonium carbonate, cuprous ammonium carbonate, and metallic copper.

Still another object of my invention is to provide a novel method of oxidizing metallic copper to cuprous oxide with ammonium carbonate.

In the practice of my invention, I have discovered that when reducing cupric ammonium carbonate or cupric ammonium sulfate solutions, respectively, with metallic copper, either cuprous ammonium carbonate or cuprous ammonium sulfate will saturate in the leaching solution, and a layer of cuprous oxide will form on the metallic copper. My invention encompasses removing this layer of cuprous oxide formed on the metallic copper by some form of attrition. The cuprous oxide forms as a suspension in the solution, while a new layer of cuprous oxide is allowed to form on the metallic copper. The cuprous oxide slurry in the cuprous ammonium salt solution is removed from the reactor and the cuprous oxide is settled out and filtered by any of known means. The resultant cuprous oxide filter cake is subsequently dried in an inert atmosphere to prevent oxidation to cupric oxide, while any volatilized ammonia and other gases such as carbon dioxide or sulfur dioxide are absorbed and returned to the process, together with the freshly oxidized cupric ammonium salt solutions filtrate recycled from the process as cuprous ammonium solution.

BRIEF DESCRIPTION OF THE DRAWINGS

Other objects and advantages will be apparent from the drawings and the following description wherein:

FIGURE 2 is a flow diagram of the process according to the present invention;

FIGURE 3 is a schematic representation of an ultra sonic attriting means attached to the reactor; and FIGURE 4 is a schematic representation of vibrational type of attriting means attached to the reactor.

DESCRIPTION OF THE PREFERRED EMBODIMENTS

Figure 1:
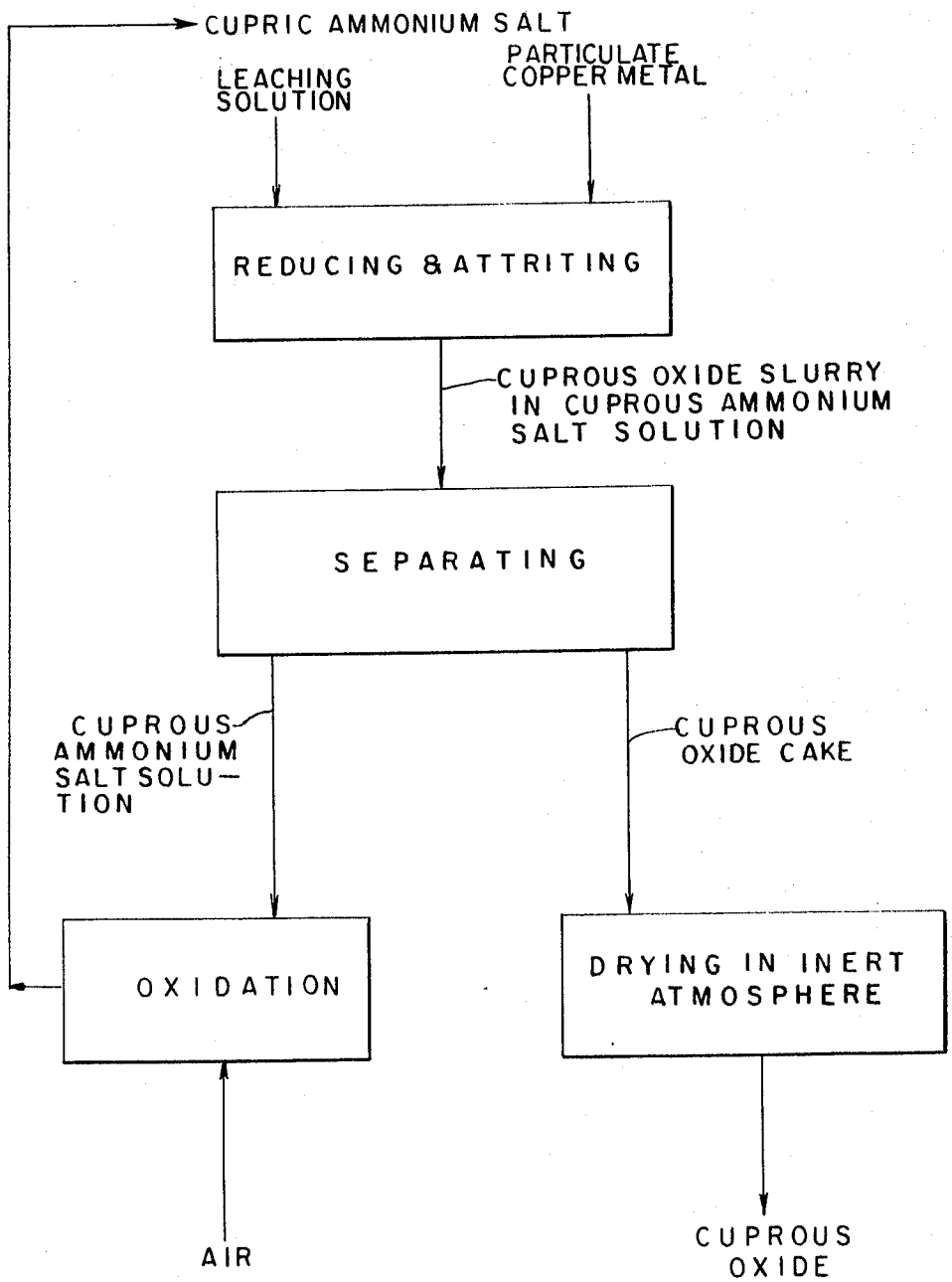
FIGURE 1 is a block diagram of the method of this invention.

The process as represented in FIGURE 1 contemplates utilizing a solution of ammonium carbonate or of ammonium sulfate to form a cupric ammonium salt solution which is reacted with copper metal which is in a particle form to obtain a saturated cuprous ammonium salt solution, whereupon a coating of cuprous oxide forms on the metallic copper. The metallic copper is continually attrited, that is, rubbed together so as to wear or grind the surfaces of the metallic copper by friction. The attriting step results in the cuprous oxide being worn off the surface of the metallic copper, thereby preparing the attrited surface to react with the cupric ammonium salt and form a coating of cuprous oxide anew on the metallic copper surface. The attrited cuprous oxide becomes suspended in the cuprous ammonium salt solution to form a slurry. The slurry is separated by any of known means such as a filter to form a clear cuprous ammonium salt solution and a cuprous oxide solid. The cuprous oxide is dried in an inert atmosphere to prevent the formation of cupric oxide. The clear cuprous ammonium salt solution is oxidized either by contact with air or oxygen to obtain a cupric ammonium salt solution and recycled into the process as fresh solution.

An embodiment of my invention is illustrated in FIGURE 2 wherein copper shot, and cupric ammonium carbonate solution and fresh ammonium carbonate solution are fed to a rotating reactor 10. The initial ammonium carbonate solution and air oxidize the copper metal to cupric ammonium carbonate in solution. The cupric ammonium carbonate solution then oxidizes the copper metal to form cuprous ammonium carbonate which goes into solution until a saturated solution of cuprous ammonium carbonate results. Upon the saturation of the cuprous ammonium carbonate solution, a layer of cuprous oxide is formed on the copper shot by the oxidation of the metallic copper by the cupric ammonium carbonate. The reactor 10 is driven by a rotary drive device 12 so as to rotate continually, thereby rubbing the copper shot in the reactor against each other and against the reactor walls causing the cuprous oxide formed on the surface of the copper shot to separate from the copper shot by attrition, and become suspended in the reactor fluid. The cuprous oxide forms a slurry in the cuprous ammonium carbonate solution, and is removed from the reactor to a flocculation tank 14 where it is mixed with a flocculent. The flocculated slurry then passes through path 16 to a settling tank 18, where the cuprous oxide in the flocculated suspension settles out as a cuprous oxide slurry in the settling tank 18. The cuprous oxide slurry is fed to a filter 22 through path 24, where it is filtered resulting in a wet cuprous oxide cake and a filtrate. The cuprous oxide cake is removed through path 26 to a dryer 28 and dried in an inert atmosphere thereby resulting in the desired cuprous oxide product. The clear supernatant liquor comprising cupric ammonium carbonate, and cuprous ammonium carbonate in solution is fed to path 30 to an oxidation tower 32 where it is mixed with air and oxidized to cupric ammonium carbonate in solution. The filtrate from the filter 20 is fed by path 34 to a juncture with path 30 where it is mixed with the supernatant liquor. The newly oxidized cupric ammonium carbonate solution is then fed to the reactor 10 through path 36 thereby being returned to the cycle.

Another embodiment of my invention is as illustrated in FIGURE 3 of the drawings. In that embodiment, the copper ammonium carbonate solution in the form of cupric ammonium carbonate is mixed with shot copper in a reactor 10 which is surrounded by an ultrasonic transducer 40. Upon the formation of a saturated solution of cuprous ammonium carbonate in the reactor, the cupric ammonium carbonate will form cuprous oxide as a layer upon the copper shot in the reactor 10. Ultrasonic vibrations produced by the ultrasonic transducer 40 will cause an attrition action upon the cuprous oxide removing it from the surface of the copper shot and placing it in suspension. The cuprous oxide suspension is fed to the flocculation tank 14 and subsequently to settling tank 18 where it is allowed to form a slurry in the bottom of the tank 18. The slurry is fed to a filter 20 where the cuprous oxide is removed from the slurry and dried to an inert atmosphere to drive off any trapped ammonia and carbon dioxide. The filtrate and the supernatant liquor from the settling tank are fed to an oxidation tower 32 where the cuprous ammonium carbonate is oxidized to cupric ammonium carbonate utilizing either air or oxygen. The freshly oxidized cupric ammonium carbonate is then recycled into the reactor.

Other means contemplated for providing attrition within the reactor as shown in FIGURE 4 are conventional forms of mechanical or electro-mechanical vibrators to vibrate the reactor and the materials therein. The reactor is mounted on a resilient support means 42. A bracket 44 on which is mounted a bearing is attached to the reactor at one end thereof. A shaft 46 is mounted to rotate within the bearing of the bracket 44 and is permanently fixed or part of a rod 48 attached to the shaft 48 at a right angle thereto. The other end of rod is permanently fixed at a right angle to a shaft so as to form a linkage joining the two shafts 48 and 52 in a fixed relation to each other. The shaft 50 is rotatably mounted in a bearing of a wheel 52. The wheel 52 is rotatable and is driven by a means not shown either in a continuous rotating motion or in a cyclic back and forth (rocking) motion so as to cause the rod to be displaced linearly in a reciprocating motion thereby imparting a vibrating motion to the reactor 10. The vibration of the reactor will in turn cause the metallic copper shot to rub against each other and the walls of the reactor 10, thereby removing any cuprous oxide from the surface of the shot by attrition. It will be understood by others skilled in the art that there are any number of means for imparting a vibrating motion to the reactor 10 and the material contained therein to obtain the required attrition.

In order to more fully illustrate the process according to the present invention the following examples are given:

EXAMPLE 1

Cupric ammonium carbonate solution was pumped into a rotating reactor containing copper shot. The reactor was a two gallon plastic bottle on a jar mill stand. The reactor slurry was treated with a flocculent specifically a trademark guar gum Jaguar 507 in a 0.05% solution using 0.416 lb./ton. Filter rates obtained with flocculent were approximately 5–10 gal./hr./ft.$^2$, while those obtained without flocculent were less than 1 gal./hr./ft.$^2$. The product which was dried under vacuum was found to contain 91.3% cuprous oxide and 5.8% cupric oxide.

EXAMPLE 2

Leaching solution containing various concentrations and ratios of $NH_3$ and $CO_2$ as shown in Table 1 were used in flasks containing 200 grams of shot copper. The flasks were subjected to an attriting action by shaking on a Burrell "wrist action" shaker. All the various concentrations of leaching solution resulted in precipitate in no more than 3 hours.

TABLE

| Initial ratio $NH_3/CO_2$ | Solution by wgt. | | Final Solution Composition at— | |
|---|---|---|---|---|
| | $NH_3$, grams/liter | $Cu^{++}$, grams/liter | 2 hr. $Cu^+$, grams/liter | 3 hr. $Cu^+$, grams/liter |
| 1.35 | 56.44 | 37.9 | 71.3 | 69.7 |
| 1.28 | 56.34 | 50.5 | 55.9 | 53.7 |
| 0.8 | 43.78 | 50.5 | 20.6 | 20.4 |
| 1.28 | 65.85 | 37.9 | 69.5 | 68.0 |
| 1.28 | 65.73 | 50.6 | 70.2 | 69.3 |
| 0.76 | 51.08 | 51.0 | 29.4 | 30.6 |
| 1.23 | 75.26 | 38.3 | 69.1 | 81.2 |
| 1.19 | 75.12 | 50.6 | 75.8 | 64.6 |
| 0.73 | 58.38 | 50.7 | 40.5 | 40.2 |

For purposes of comparison a leaching solution of cupric ammonium carbonate was pumped upward through a 2 inch diameter, 3 feet column filled with shot copper.

Cuprous oxide was not flushed from the top of the column. Actually it was found that the cuprous oxide formed a coating on the shot surface thereby preventing a further reduction and illustrating the problem which is overcome by the present invention.

The invention as specifically described is not to be construed as limited to the particular forms disclosed herein, since these are to be regarded as illustrative rather than restrictive.

I claim:
1. A process for producing cuprous oxide from metallic copper, comprising:
    (a) adding a solution of cupric salts selected from the group consisting of cupric ammonium carbonate and cupric ammonium sulfate to the metallic copper said solution having cupric ++ ion in solution;
    (b) reacting the cupric ++ ion in said solution with the metallic copper to obtain a saturated solution of cuprous salt and to thereafter form a layer of cuprous oxide on the surface of the metallic copper;
    (c) continually removing the layer of cuprous oxide from the surface of the metallic copper by attrition;
    (d) continually reacting additional cupric ++ ion in said solution with the attrited surface of the metallic copper to form a new layer of cuprous oxide, thereby causing the continuous formation and removal of cuprous oxide from the metallic copper until a slurry of cuprous oxide is contained in said solution; and
    (e) separating the cuprous oxide from the slurry of cuprous oxide in the solution.
2. The process of claim 1 wherein the step of removing the layer of cuprous oxide from the metallic copper by attrition comprises, continuously agitating the metallic copper in the solution of cupric ion.
3. The process of claim 1 wherein the cupric ion solution, is a solution of cupric ammonium carbonate, which is reduced to cuprous ammonium carbonate by the metallic copper.
4. The process of claim 2 wherein the step of continuously agitating the metallic copper in the cupric ion solution comprises:
    (a) placing the metallic copper and cupric ion solution in a reactor; and
    (b) continuously rotating the reactor, whereby the metallic copper is subject to attrition.
5. The process as described in claim 2 wherein the continuous agitation of the metallic copper in the solution, comprises, vibrating the metallic copper.
6. The process of claim 4 in which the step of vibrating the metallic copper comprises, ultrasonically vibrating the metallic copper.
7. The process for producing cuprous oxide as described in claim 1 which comprises:
    settling the cuprous oxide in the slurry from the reacted solution in a settling tank to obtain a cuprous oxide mud and a supernatant liquor;
    filtering the cuprous oxide mud to remove entrapped reacted solution as filtrate, and obtain a cuprous oxide cake;
    oxidizing the supernatant liquor and the filtrate to reform the cupric ++ ion in solution; and
    recycling the reformed solution to the metallic copper reactant.
8. The process as described in claim 7 wherein the metallic copper comprises copper shot.
9. The process of claim 7 which additionally comprises the steps of:
    (a) placing the cuprous oxide cake in an inert atmosphere; and
    (b) drying the cuprous oxide cake.
10. The process as described in claim 1 comprising the additional step of:
    (a) adding flocculent to the cuprous oxide slurry in a mixing tank; and
    (b) placing the flocculated cuprous oxide in a settling tank in order to separate the reacted solution as supernatant liquor from the flocculated cuprous oxide mud.

References Cited
UNITED STATES PATENTS

| | | | |
|---|---|---|---|
| 2,474,497 | 6/1949 | Rowe | 23—147 |
| 2,474,533 | 6/1949 | Klein | 23—147 |
| 2,536,096 | 1/1951 | Rowe | 23—147 |

OSCAR R. VERTIZ, Primary Examiner

HOKE S. MILLER, Assistant Examiner

U.S. Cl. X.R.

23—285